United States Patent
Yu et al.

(10) Patent No.: US 11,709,256 B2
(45) Date of Patent: Jul. 25, 2023

(54) SCOOTER RADAR DETECTION SYSTEM

(71) Applicant: CUB ELECPARTS INC., Fuxing Township, Changhua County (TW)

(72) Inventors: San-Chuan Yu, Fuxing Township, Changhua County (TW); Ya-Ling Chi, Fuxing Township, Changhua County (TW); Dong-Shan Tsai, Fuxing Township, Changhua County (TW); Te-Yu Lu, Fuxing Township, Changhua County (TW); Chi-Yu Hung, Fuxing Township, Changhua County (TW)

(73) Assignee: CUB ELECPARTS INC., Fuxing Township (TW)

( * ) Notice: Subject to any disclaimer, the term of this patent is extended or adjusted under 35 U.S.C. 154(b) by 951 days.

(21) Appl. No.: 16/376,853

(22) Filed: Apr. 5, 2019

(65) Prior Publication Data
US 2020/0241129 A1   Jul. 30, 2020

(30) Foreign Application Priority Data

Jan. 30, 2019  (TW) .................................. 108103550

(51) Int. Cl.
  *G01S 13/931*  (2020.01)
  *G01S 7/40*  (2006.01)
  *B60W 10/06*  (2006.01)
(52) U.S. Cl.
  CPC ........... *G01S 13/931* (2013.01); *B60W 10/06* (2013.01); *G01S 7/4004* (2013.01);
  (Continued)

(58) Field of Classification Search
  CPC .......... G01S 13/931; G01S 2013/9315; G01S 7/4004; B60W 2300/365; B60W 2420/52; B60W 10/06
  (Continued)

(56) References Cited

U.S. PATENT DOCUMENTS 8,072,351 B1 * 12/2011 Absher, II .............. B60Q 9/008
  340/904
11,345,311 B2 * 5/2022 Zhang ..................... B60R 25/24
  (Continued)

FOREIGN PATENT DOCUMENTS

CN        107199965 A   *  9/2017  ............. B60Q 9/008
WO  WO-2017217936 A1  * 12/2017  ............. B60L 53/14

OTHER PUBLICATIONS

F.G. Jansen, Automotive radar sensor for ultra short range applications, IEEEm (Year: 2017).*
(Continued)

*Primary Examiner* — Nuzhat Pervin
(74) *Attorney, Agent, or Firm* — Muncy, Geissler, Olds & Lowe, P.C.

(57) ABSTRACT

Provided is a scooter radar detection system for a scooter, including: a control module for controlling operation of the scooter radar detection system; two detection radars flanking a license plate, facing the rear of the scooter, and being in signal connection with the control module; two flash alert units disposed at rear-view mirrors on two sides of the scooter, respectively, and being in signal connection with the control module; and a vibration alert module disposed below a seat and being in signal connection with the control module.

9 Claims, 5 Drawing Sheets

(52) U.S. Cl.
CPC ... *B60W 2300/365* (2013.01); *B60W 2420/52* (2013.01); *G01S 2013/9315* (2020.01)

(58) Field of Classification Search
USPC .......................................................... 342/70
See application file for complete search history.

(56) References Cited

U.S. PATENT DOCUMENTS

| | | | |
|---|---|---|---|
| 2002/0185323 A1* | 12/2002 | Tsutsumi | F02M 35/116 180/219 |
| 2008/0061956 A1* | 3/2008 | Takeuchi | B62J 6/16 340/476 |
| 2015/0228066 A1* | 8/2015 | Farb | G06V 20/58 348/148 |
| 2017/0101056 A1* | 4/2017 | Park | G08G 1/04 |
| 2017/0176591 A1* | 6/2017 | Pineda-Deom | G08G 1/167 |
| 2018/0222387 A1* | 8/2018 | Wu | B60R 13/10 |
| 2018/0326906 A1* | 11/2018 | Savaresi | B62J 45/4151 |
| 2020/0130771 A1* | 4/2020 | Jacobsz Rosier | B62K 23/02 |
| 2021/0061391 A1* | 3/2021 | Yamashita | B60R 13/105 |

OTHER PUBLICATIONS

"Automotive radar sensor for ultra short range applications", F.G. Jansen, The 18th International Radar Symposium IRS 2017, Jun. 28-30, 2017, Prague, Czech Republic. (Year: 2017).*
"Automotive radar sensor for ultra short range applications", F.G. Jansen, The 18* International Radar Symposium IRS2017, Jun. 28-30, 2017, Prague, Czech Republic. (Year: 2017).*

* cited by examiner

SCOOTER RADAR DETECTION SYSTEM

BACKGROUND OF THE INVENTION

1. Technical Field

The present invention relates generally to the field of the safety device of scooter and more particularly to a scooter radar detection system.

To enhance road traffic safety and prevent collision-related traffic accidents, it is normal to mount a detection device on the body of a vehicle so as to perform blind spot detection. However, it is more difficult for scooters to perform blind spot detection than cars for two reasons. First, scooters are susceptible to errors of radar installation angles. Second, every scooter leans when turning, thereby leading to random angular deviations of its detection radar, especially when the scooter has only one radar detection device. In an attempt to overcome the aforesaid drawbacks, US2017/0176591 discloses performing active correction by a high-precision gyroscope, servo motor and linkage member. The gyroscope is provided in the form of a three-axis gyro mounted on a stable table to achieve dynamic continuous measurement and initial alignment of a slope-measuring instrument by a rotational skeleton framework on condition that bias errors are eliminated. Gyroscope parameters vary with use and time, thereby deteriorating measurement precision. The aforesaid measurement is preferably slow. The servo motor is mounted on the external skeleton and its leads must exit a recess on the external skeleton; hence, the servo motor cannot be mounted in place easily but is susceptible to damage. The aforesaid disclosure of US2017/0176591 not only increases manufacturing costs greatly but also renders the servo motor and the linkage member susceptible to failures.

Furthermore, it is inappropriate to apply CAN (Controller Area Network) systems of cars to scooters directly. It is because car bus system technology mostly involves using a CAN bus as a communication center for electronic control units. However, car CAN bus systems are mostly provided in the form of two-route bus systems, that is, being in the form of a high-speed CAN bus, i.e., power CAN bus. Control systems related to car power and safety are applied to engine management systems, gearbox control units, and anti-lock braking systems. The car CAN bus using the other route is applied to car body controllers and comfort enhancing systems, such as smart chairs. The conventional power CAN bus and car CAN bus use different protocols, respectively, and thus are incompatible; hence, it is difficult to integrate modules of the two buses. Moreover, the protocols are not dedicated to scooters, and in consequence the aforesaid functions are unavailable to scooters. Therefore, it is imperative to provide a radar system without any CAN bus with a view to meeting the need for scooter blind spot detection and track changing.

BRIEF SUMMARY OF THE INVENTION

It is an objective of the present disclosure to provide a scooter radar detection system which is structurally simple and demonstrates stability of detection efficacy.

In order to achieve the above and other objectives, a scooter radar detection system of the present disclosure comprises: a control module for controlling operation of the scooter radar detection system; a plurality of detection radars flanking a license plate, facing the rear of the scooter, and being in signal connection with the control module; a plurality of flash alert units disposed at rear-view mirrors on two sides of the scooter, respectively, and being in signal connection with the control module; and a vibration alert module disposed below a seat and being in signal connection with the control module.

Preferably, the scooter radar detection system has two detection radars flanking the license plate.

Preferably, the two detection radars each have an emitting surface for emitting radar waves, the emitting surface having a normal, and an included angle between the normal and the central line of the scooter is 40°~50°.

Preferably, the scooter radar detection system has two alert units which are flash alert devices integrated into rear-view mirrors on two sides of the scooter, respectively.

Fine structures, features, assembly or operation of the scooter radar detection system of the present disclosure are illustrated by embodiments and described below. However, persons skilled in the art understand that the description below and the specific embodiments are illustrative of the present disclosure rather than restrictive of the claims of the present disclosure.

DETAILED DESCRIPTION OF THE INVENTION

Figure 1:
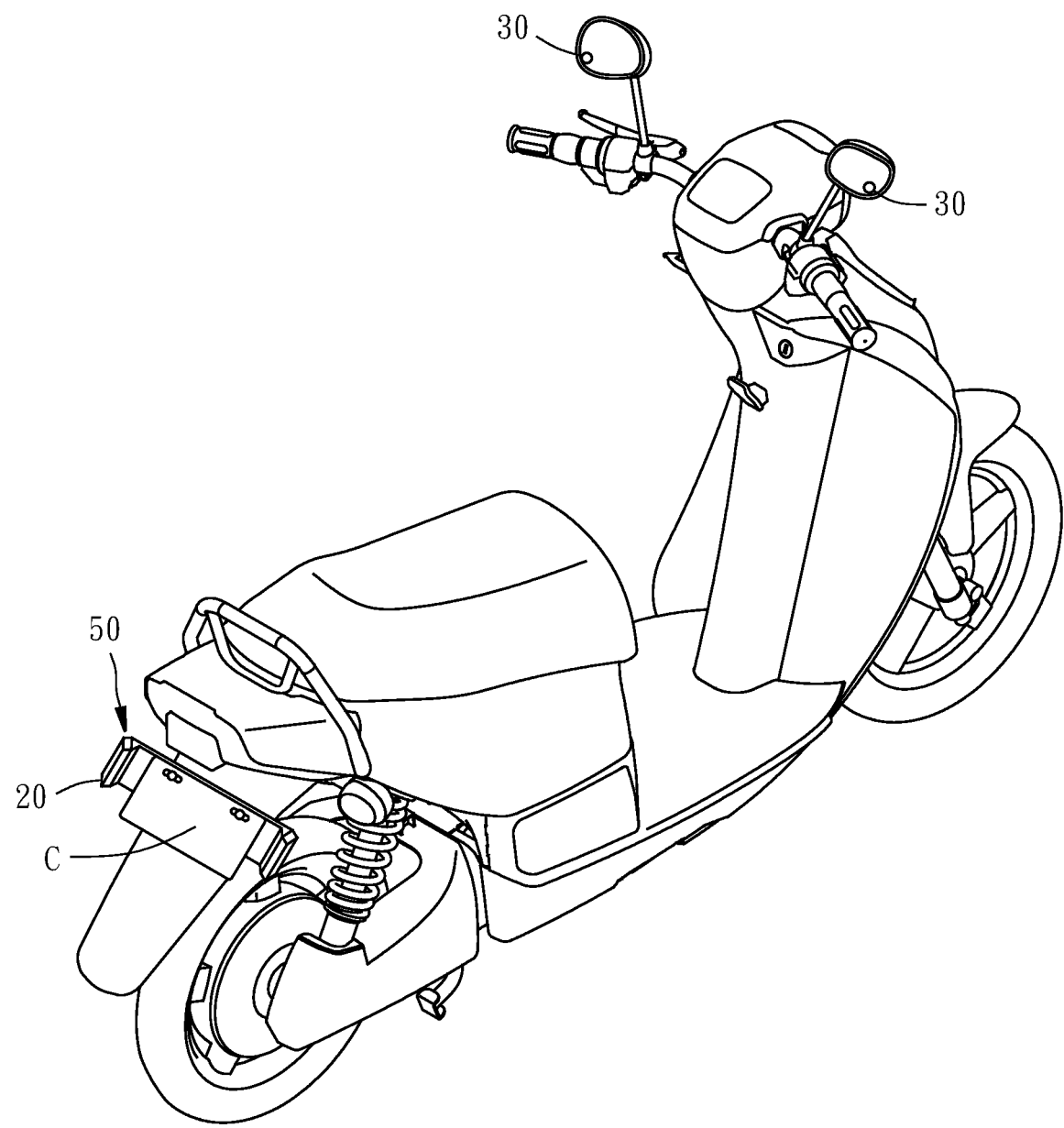
FIG. 1 is a perspective view of a scooter radar detection system mounted on a scooter according to the present disclosure.

Referring to FIG. 1 through FIG. 4, a scooter radar detection system of the present disclosure is mounted on a scooter. The scooter herein is defined as a means of transport which has two or three wheels and is powered by an internal combustion engine or an electric motor. The scooter radar detection system of the present disclosure comprises a control module 10, a plurality of detection radars 20, a plurality of alert units 30 and a vibration alert module 40.

The control module 10 comprises a power line 11 and a control circuit for controlling the operation of the scooter radar detection system. The power line 11 is connected to a battery B of the scooter. The control module 10 is in signal connection with a control system of the scooter and thus is started as soon as the power to the scooter is on. The control module 10 comprises a microcontroller unit (MCU) (not shown) capable of computation, memory storage, and digital to analog signal conversion. A user configures the detection device 10 through a human-machine interface (not shown) and thereby configures the level of a danger alert or user needs.

Figure 2:
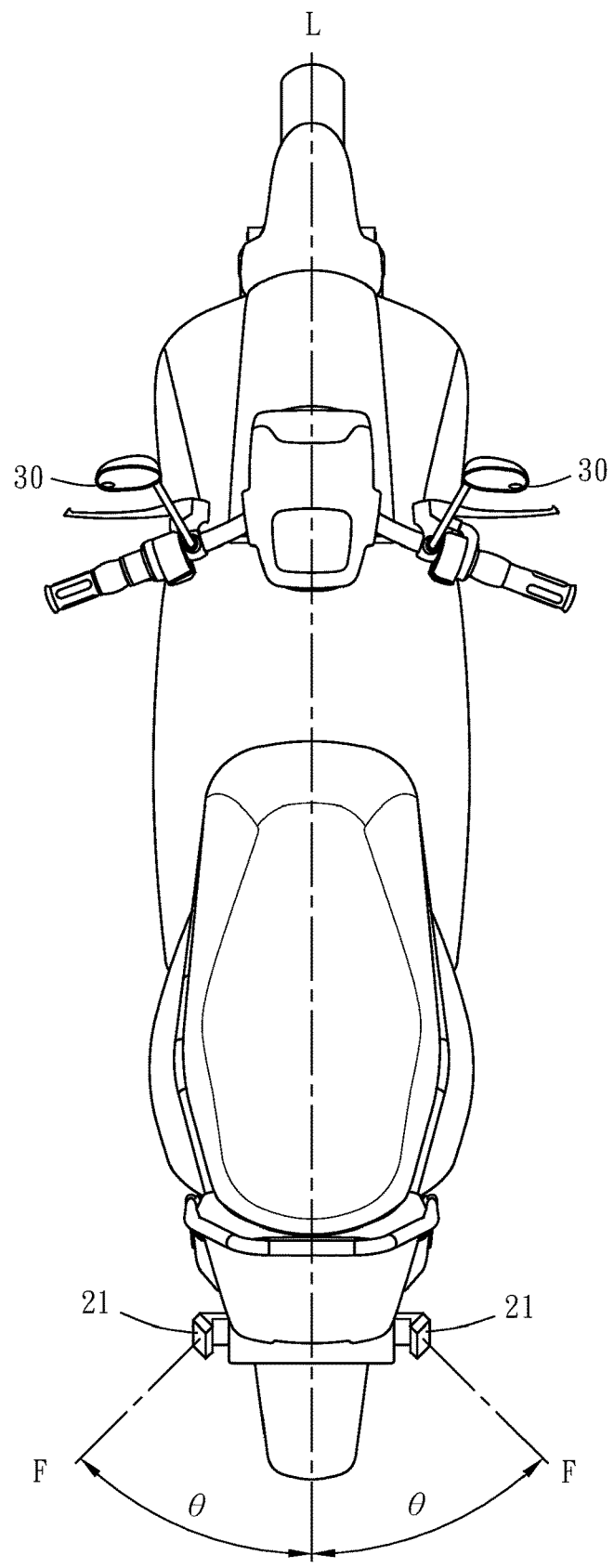
FIG. 2 is a top view of the scooter radar detection system mounted on the scooter according to the present disclosure.
Figure 3:
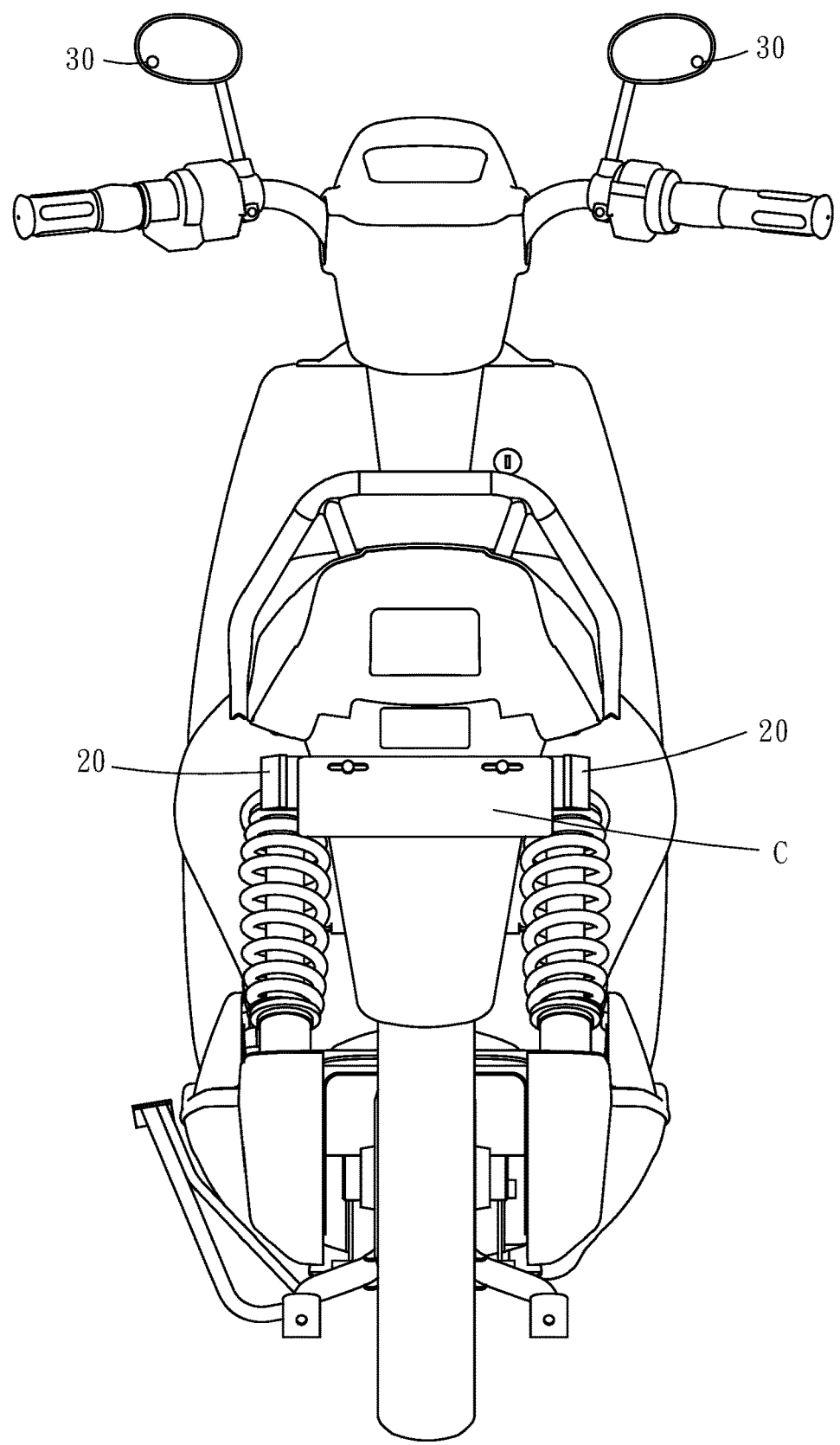
FIG. 3 is a rear view of the scooter radar detection system mounted on the scooter according to the present disclosure.
Figure 4:
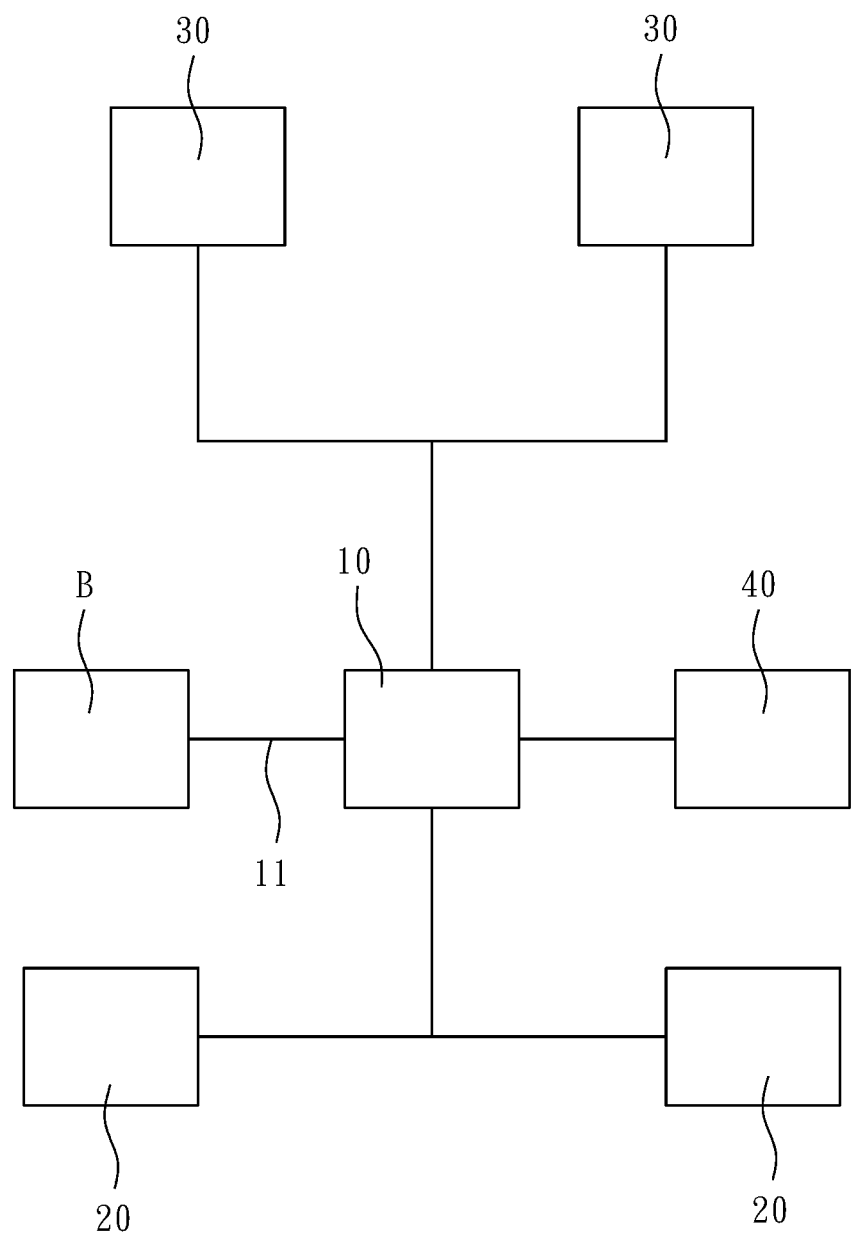
FIG. 4 is a block diagram of the scooter radar detection system of the present disclosure.

The plurality of detection radars 20 are disposed on two sides of the scooter and are in signal connection with the control module 10 so as to be controlled by the control module 10 and operate. In this embodiment, the detection radars 20 each comprise a radar array antenna operating at a frequency of 10~81 GHz. The frequency depends on user choice, radar, and detectable resolution. The detection radars 20 are disposed on two sides of the scooter by putting the detection radars 20 on two sides of a central line L joining the front wheel and the rear wheel. Preferably, the detection radars 20 are disposed at two ends of a license plate C at the rear of the scooter, respectively, and face backward. The antennas are two receiving antennas, namely a wideband antenna and a narrowband antenna. The wideband has a width A. The narrowband has a width B. According to the present disclosure, the detection radars 20 disposed at the rear of the scooter have A=120°~140° and B=10°~30°. The wideband antenna and the narrowband antenna deal with their respective regions and carry out their respective functions. The wideband antenna has a large visual field, deals with a region of a small radius and performs blind spot region surveillance. The narrowband antenna has a small visual field, deals with a region of a large radius and performs track changing assistance. Referring to FIG. 2 and FIG. 3, the two detection radars 20 each have an emitting surface 21 for emitting radar waves. The emitting surface has a normal F perpendicular to the emitting surface. The included angle θ between the normal F and the central line L is 40°~50°, preferably 45°, to perform blind spot region surveillance and track changing assistance simultaneously.

The plurality of alert units 30 are disposed on two sides of the scooter and between a seat and the front edge of the front wheel. In this embodiment, the two alert units 30 are in signal connection with the control module 10 so as to be controlled by the control module and thus generate an alert. The two alert units 30 are sound alert devices or flash alert devices which generate alerts of different levels in response to different dangerous situations. The two alert units 30 have two advantages: first, enhancing user experience; second, being mounted on two sides of the scooter or integrated into rear-view mirrors on two sides of the scooter, respectively.

The vibration alert module 40 is disposed below the seat of the scooter. The vibration alert module 40 is in signal connection with the control module 10 so as to be controlled by the control module 10 and thus generate a vibration alert. The vibration alert module 40 performs pressure measurement and is a pressure-based microelectromechanical sensor, a capacitive microelectromechanical pressure sensor, and any type of microelectromechanical pressure sensor. The vibration alert module 40 converts a pressure level into a signal indicative of pressure, and it is feasible for the signal to be a digital signal. The purpose of the vibration alert module 40 is to gather information pertaining to deviation of occupation of the seat and suggest that the cyclist should change his/her posture or position, so as to enhance the efficacy of the vibration alert.

Owing to the aforesaid structural features, the scooter radar detection system of the present disclosure is mounted on the scooter such that the two detection radars 20 enable the cyclist (normally facing forward) riding the scooter to perform detection on the two sides of the scooter, especially the rear of the scooter, and thereby assist the cyclist in inspecting otherwise invisible blind spots at the rear. As soon as the two detection radars 20 detect abnormality within a detection region, for example, an object or pedestrian within a detection region on one of the two sides of the scooter, the control module 10 sends an alert signal to the alert unit 30 on the abnormal side such that the alert unit 30 sends an alert signal, such as a reminder sound or a flash alert. However, an optical alert device is susceptible to interference from ambient light, and in consequence the cyclist riding the scooter is likely to neglect an alert message delivered only by an indicator. To overcome this drawback, the control module 10 further sends a signal to the vibration alert module 40 such that the vibration alert module 40 vibrates, allowing the cyclist riding the scooter to perceive the vibration of the seat which the cyclist is sitting on. Therefore, the remind is effected twice.

Figure 5:
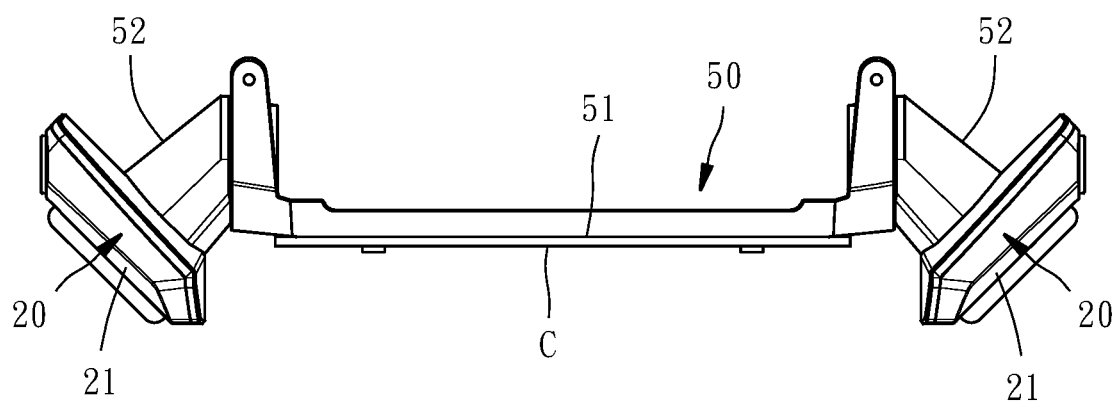
FIG. 5 is a top perspective view of a holder according to the present disclosure.

The scooter radar detection system must be mounted in place at points on the scooter, and the points on the scooter are chosen to ensure optimal scooter's resistance to vibration as well as enhance installation precision. Furthermore, considerations must be given to the question as to whether there is still sufficient supportive strength after the detection radars 20 have been mounted in place. Therefore, the scooter radar detection system of the present disclosure further comprises a holder 50 disposed at the rear of the scooter. The holder 50 has a centrally-located panel surface 51 and two mounting ramps 52 pivotally connected to two edges of the panel surface 51, respectively. The two mounting ramps 52 are rotatable relative to the panel surface 51 to enable angular adjustment. The two detection radars 20 are disposed on the two mounting ramps 52 at the two ends of the holder 50, respectively. The license plate C is disposed on the panel surface 51 centrally located at the holder 50, as shown in FIG. 5. It is difficult for the radars to be mounted on the scooter and calibrated, because of a wide variety of styles, heights and widths of the scooter. Furthermore, not every maintenance factory offers radar calibration service; hence, neither an immovable support nor being fixedly disposed in a receiving slot of a casing is an effective solution. In particular, maintenance often entails demounting the casing, and thus it is advisable not to have the radars fixedly disposed in the receiving slot of the casing.

What is claimed is:

1. A scooter radar detection system, for a scooter, comprising:
a control module comprising a control circuit for controlling operation of the scooter radar detection system;
a plurality of detection radars being in signal connection with the control module so as to be controlled by the control module and operate;
a plurality of alert units disposed on two sides of the scooter, respectively, and being in signal connection with the control module so as to be controlled by the control module and generate an alert; and
a holder disposed at a rear of the scooter, the holder comprising a mounting panel and two mounting arms, the mounting arms being connected to two opposite sides of the mounting panel, the mounting arms extending outwardly from the opposite sides of the mounting panel, a license plate being disposed at the mounting panel, the plurality of detection radars being disposed at the two mounting arms.

2. The scooter radar detection system of claim 1, wherein the plurality of detection radars are disposed on two sides of the scooter, respectively, by putting the plurality of detection radars on two sides of a central line joining a front wheel and a rear wheel, respectively.

3. The scooter radar detection system of claim 2, wherein the plurality of detection radars are flanked by the license plate.

4. The scooter radar detection system of claim 2, wherein the plurality of detection radars each have an emitting surface for emitting radar waves, the emitting surface having a normal, and an included angle between the normal and the central line is 40°~50°.

5. The scooter radar detection system of claim 1, wherein the plurality of alert units are flash alert devices integrated into rear-view mirrors on two sides of the scooter, respectively.

6. The scooter radar detection system of claim 3, wherein the plurality of alert units are flash alert devices integrated into rear-view mirrors on two sides of the scooter, respectively.

7. The scooter radar detection system of claim 1, wherein the plurality of detection radars each have an emitting surface for emitting radar waves, the emitting surface having a normal, and an included angle between the normal and a central line joining a front wheel and a rear wheel is 40°~50°.

8. The scooter radar detection system of claim 1, further comprising a vibration alert module disposed below a seat and being in signal connection with the control module so as to be controlled by the control module and vibrate.

9. The scooter radar detection system of claim 1, wherein the two mounting arms are rotatable relative to the mounting panel.

\* \* \* \* \*